United States Patent
Chu et al.

(10) Patent No.: US 8,681,467 B2
(45) Date of Patent: Mar. 25, 2014

(54) SURGE PROTECTION APPARATUS AND METHOD USING THE SAME

(75) Inventors: Kwang-Uk Chu, Daejeon (KR); Up Namkoong, Buyeo-gun (KR); Kyung-Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 13/326,543

(22) Filed: Dec. 15, 2011

(65) Prior Publication Data

US 2012/0268855 A1     Oct. 25, 2012

(30) Foreign Application Priority Data

Apr. 25, 2011    (KR) .................. 10-2011-0038414

(51) Int. Cl.
*H02H 1/00* (2006.01)
(52) U.S. Cl.
USPC .................................... 361/117; 361/127
(58) Field of Classification Search
USPC ......................... 361/117–120, 127
See application file for complete search history.

(56) References Cited

U.S. PATENT DOCUMENTS

| | | | |
|---|---|---|---|
| 3,771,049 A * | 11/1973 | Piccione ................. | 340/664 |
| 3,973,224 A | 8/1976 | Gaule et al. | |
| 4,577,255 A * | 3/1986 | Martin ................. | 361/119 |
| 6,157,529 A * | 12/2000 | Ahuja ................. | 361/111 |
| 7,755,873 B2 * | 7/2010 | Crevenat et al. ....... | 361/91.1 |
| 8,227,989 B2 * | 7/2012 | Kim ................. | 313/594 |
| 2009/0002908 A1 * | 1/2009 | Chiang ................. | 361/104 |

FOREIGN PATENT DOCUMENTS

JP     1979-008847 A    1/1979

* cited by examiner

*Primary Examiner* — Danny Nguyen
(74) *Attorney, Agent, or Firm* — LRK Patent Law Firm

(57) ABSTRACT

A surge protection apparatus is provided. The surge protection apparatus includes a non-linear element unit, a signal generation unit, and a switching element unit. The non-linear element unit enables an electrical surge to pass therethrough by rapidly decreasing resistance of the non-linear element unit when the difference in voltage between two ends of the non-linear element unit is equal to or greater than a predetermined value. The signal generation unit generates a control signal in response to current which passes through the non-linear element unit. The switching element unit switches the status thereof in response to the control signal.

9 Claims, 13 Drawing Sheets

FIG. 1
(PRIOR ART)

| TYPE OF INJECTION | | PEAK SHORT-CIRCUIT CURRENT I (A) | SOURCE IMPEDANCE Z (Ω) | RISE TIME (S) | FWHM (S) | ACCEPTANCE TEST LOAD IMPEDANCE (Ω) |
|---|---|---|---|---|---|---|
| SHORT PULSE | COMMON MODE | 5,000 | $\geq 60$ | $\geq 2 \times 10^{-8}$ | $5 \times 10^{-7} \sim 5.5 \times 10^{-7}$ | NOT APPLICABLE |
| | WIRE-TO-GROUND | 2,500 | | | | 2 OR $V_{RATED} / I_{RATED}$ |
| INTERMEDIATE PULSE | COMMON MODE | 250 | $\geq 10$ | $\leq 1.5 \times 10^{-6}$ | $3 \times 10^{-3} \sim 5.5 \times 10^{-3}$ | NOT APPLICABLE |
| | WIRE-TO-GROUND | 250 | | | | 50 |
| LONG PULSE | COMMON MODE | 1,000 | $\geq 5$ | $\leq 0.2$ | $20 \sim 50$ | NOT APPLICABLE |
| | WIRE-TO-GROUND | 1,000 | | | | 50 |

FIG.9
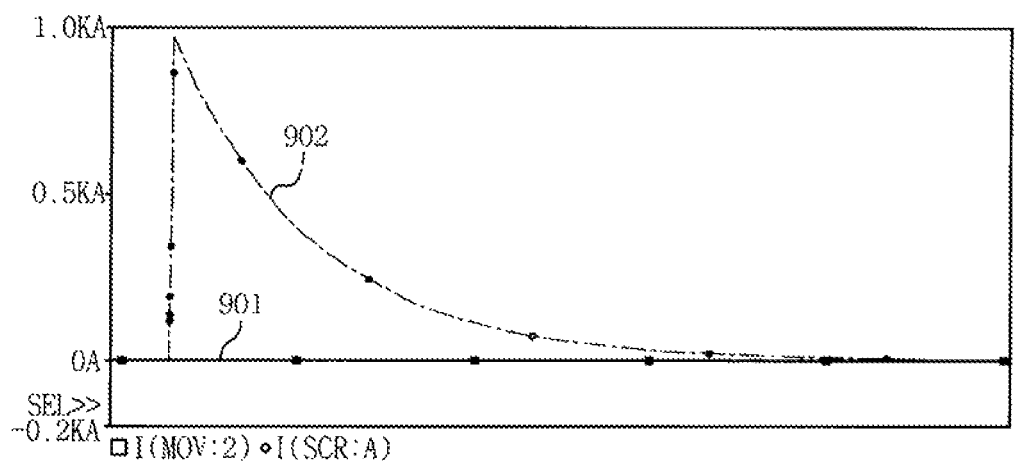
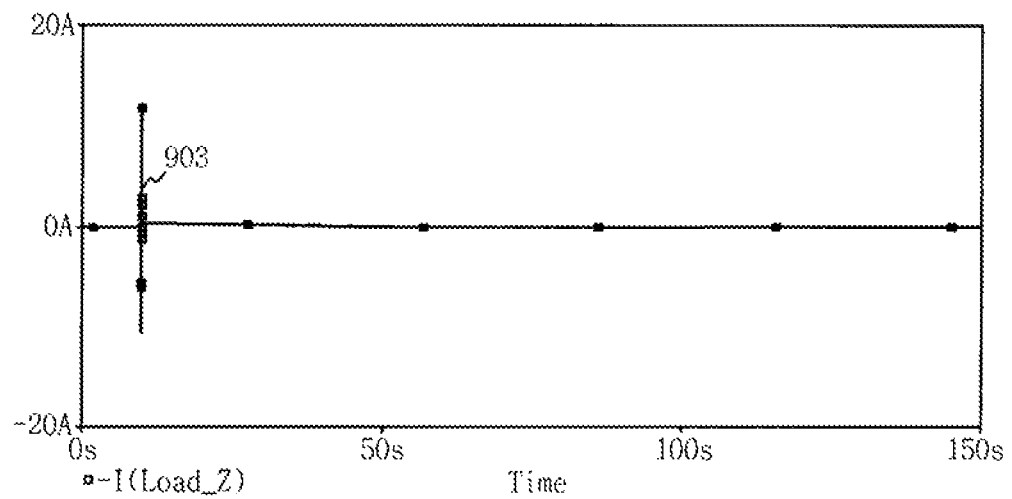

SURGE PROTECTION APPARATUS AND METHOD USING THE SAME

CROSS REFERENCE TO RELATED APPLICATION

This application claims the benefit of Korean Patent Application No. 10-2011-0038414, filed on Apr. 25, 2011, which is hereby incorporated by reference in its entirety into this application.

BACKGROUND OF THE INVENTION

1. Technical Field

The present invention relates generally to a surge protection apparatus and a method using the same, and, more particularly, to a surge protection apparatus and a method using the same, which blocks a high power surge or a high energy surge for a long time period.

2. Description of the Related Art

Generally, when a surge greater than rated voltage or current flows into an electricity/electronic apparatus, the electricity/electronic may malfunction or be damaged. Here, a surge is a pulse created by an instant and sudden large increase in voltage or current.

Surges are normally generated because of lighting and a sudden load change, and are generated when a High Altitude Electro-Magnetic Pulse (HEMP), obtained when a nuclear device is exploded at an altitude of 30 km or higher, is coupled to a power cable or a communication cable.

FIG. 1 illustrates the conditions of a Pulse Current Injection (PIC) test that commercial power cables of facilities are subjected to in conformity of MIL-STD-188-125-1 which is the military standard of the United States of America related to HEMP protection.

Referring to FIG. 1, a current of 10 A or less should flow through a load resistor when a high power short pulse is applied, and performance degradation or physical damage should not occur when high energy intermediate pulse or long pulse is applied.

Generally, in order to block the inflow of a surge, a surge protection apparatus is provided at the front end of a specific circuit, and a filter is provided at the rear end of the circuit, so that the component of a surge which is equal to or greater than a set value is first blocked using the surge protection apparatus, and then the unnecessary remaining component of a frequency band is removed using the filter.

Prior art surge protection apparatuses include non-linear elements, such as a varistor, a gas discharge tube and a transient voltage suppression diode, in which resistance rapidly decreases when the difference in voltage between the two ends of such a surge protection apparatus is equal to or greater than a preset value.

Such a surge protection apparatus may effectively block a high power surge such as a short pulse. However, in the case of a high energy surge persisting for a long time period, such as an intermediate pulse or a long pulse, there are problems of performance degradation and physical damage because a non-linear element is overheated or electrodes are damaged.

SUMMARY OF THE INVENTION

Accordingly, the present invention has been made keeping in mind the above problems occurring in the prior art, and an object of the present invention is to provide a surge protection apparatus and a method using the same, which blocks a high power surge and a high energy surge for a long period of time.

In order to accomplish the above object, the present invention provides a In order to accomplish the above object, the present invention provides a surge protection apparatus, including a non-linear element unit for enabling an electrical surge to pass therethrough by rapidly decreasing resistance of the non-linear element unit when a difference in voltage between two ends of the non-linear element unit is equal to or greater than a predetermined value; a signal generation unit for generating a control signal in response to current which passes through the non-linear element unit; and a switching element unit for changing switching status thereof in response to the control signal.

The non-linear element unit may include at least one of a varistor, a gas discharge tube, and a transient voltage suppression diode.

The signal generation unit may include a transformer.

The signal generation unit may include a transformer and a zener diode.

The signal generation unit may include a transformer, a zener diode, and a capacitor.

The signal generation unit may include one or more resistors.

The signal generation unit may include one or more resistors and a zener diode.

The switching element unit may include at least one of a thyristor and a relay.

The thyristor is a Silicon Controlled Rectifier (SCR).

In order to accomplish the above object, the present invention provides a surge protection method, including enabling an electrical surge to pass through by rapidly decreasing resistance of a non-linear element unit when a difference in voltage between two ends of the non-linear element unit is equal to or greater than a predetermined value; generating a control signal in response to current, which passes through the non-linear element unit, using a signal generation unit; and changing switching status of a switching element unit in response to the control signal.

The generating the control signal may include generating a control signal wherein voltage of the generated control signal is restricted to an allowable range of the switching element unit using a zener diode or a capacitor.

BRIEF DESCRIPTION OF THE DRAWINGS

The above and other objects, features and advantages of the present invention will be more clearly understood from the following detailed description taken in conjunction with the accompanying drawings, in which:

FIG. 1 is a table illustrating the conditions of a Pulse Current Injection (PIC) test that commercial power cables of facilities are subjected to in conformity of MIL-STD-188-125-1 which is the military standard of the United States of America related to HEMP protection;

FIG. 9 is a view illustrating the results of a simulation performed by the simulation circuit of FIG. 8;

DESCRIPTION OF THE PREFERRED EMBODIMENTS

Figure 2:
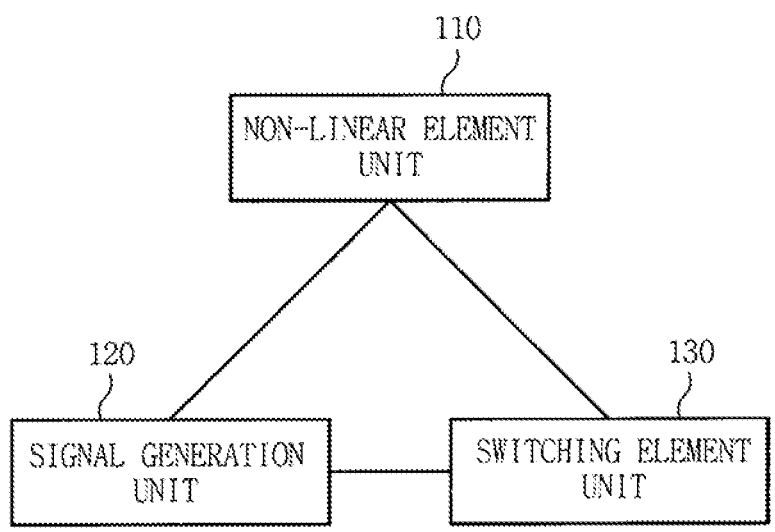
FIG. 2 is a view schematically illustrating the configuration of a surge protection apparatus according to an embodiment of the present invention.

The present invention will be described in detail with reference to the accompanying drawings below. Here, in cases where the description would be repetitive and detailed descriptions of well-known functions or configurations would unnecessarily obscure the gist of the present invention, the detailed descriptions will be omitted. The embodiments of the present invention are provided to complete the explanation of the present invention to those skilled in the art. Therefore, the shapes and sizes of, components in the drawings may be exaggerated to provide a more exact description.

Hereinafter, a surge protection apparatus and a method using the same according to embodiments of the present invention will be described in detail with reference to the accompanying drawings.

Figure 3:
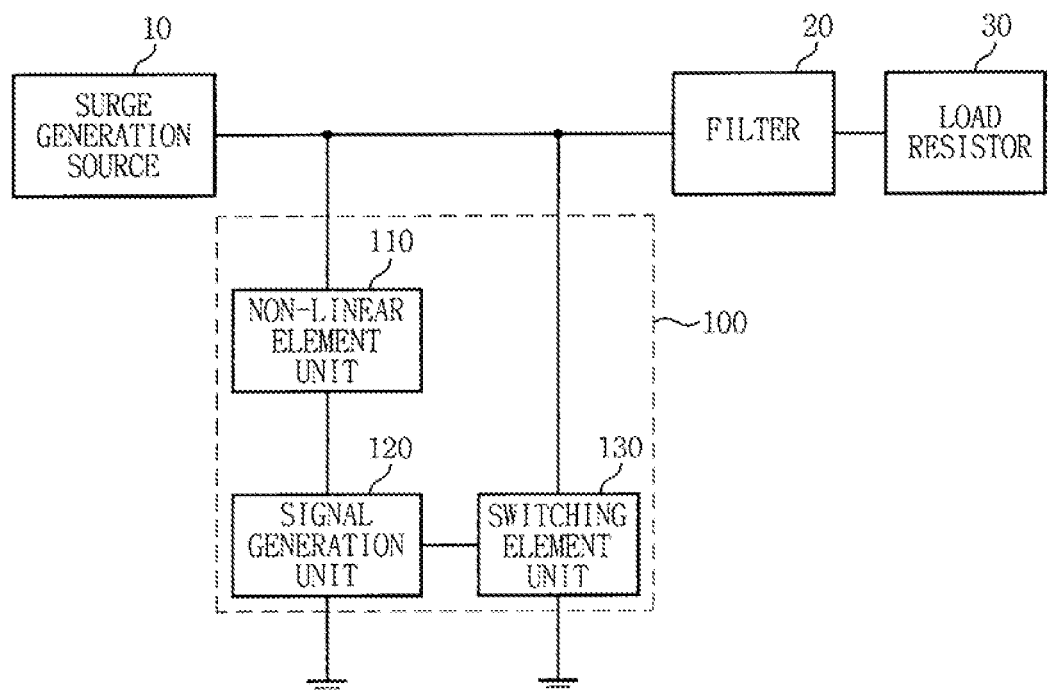
FIG. 3 is a view illustrating a circuit to which the surge protection apparatus according to the embodiment of the present invention is applied.

FIG. 2 is a view schematically illustrating the configuration of a surge protection apparatus according to an embodiment of the present invention. FIG. 3 is a view illustrating a circuit to which the surge protection apparatus according to the embodiment of the present invention is applied.

Referring to FIG. 2, a surge protection apparatus 100 includes a non-linear element unit 110, a signal generation unit 120, and a switching element unit 130.

The non-linear element unit 110 enables an electrical surge whose voltage is higher than the predetermine voltage to pass through the non-linear element unit 110 in such a way that resistance increases when the difference in voltage between the two ends is equal to or less than a predetermine value, and resistance rapidly decreases when the difference in voltage between the two ends is equal to or greater than the predetermine value.

The non-linear element unit 110 according to the embodiment of the present invention includes at least one of a varistor, a gas discharge tube, and a transient voltage suppression diode.

The signal generation unit 120 generates a control signal used to switch the status of the switching element unit 130 in response to a current which passes through the non-linear element unit 110.

The signal generation unit 120 according to the embodiment of the present invention includes a transformer.

The signal generation unit 120 according to the embodiment of the present invention includes a transformer and a zener diode.

The signal generation unit 120 according to the embodiment of the present invention includes a transformer, a zener diode, and a capacitor.

The signal generation unit 120 according to the embodiment of the present invention includes one or more resistors.

The signal generation unit 120 according to the embodiment of the present invention includes one or more resistors, and a zener diode.

The switching element unit 130 switches the switching status thereof in response to the control signal.

The switching element unit 130 according to the embodiment of the present invention includes at least one of a thyristor and a relay.

The thyristor is a Silicon Controlled Rectifier (SCR).

Referring to FIG. 3, a circuit to which the surge protection apparatus 100 according to the embodiment of the present invention is applied includes a surge generation source 10 for generating pulses which satisfy the conditions of the PCI test of FIG. 1 on the input side of the surge protection apparatus 100, includes a filter 20 for removing unnecessary remaining components of a frequency band on the output side of the surge protection apparatus 100, and includes a load resistor 30.

In detail, when the surge protection apparatus 100 receives a surge which is equal to or higher than a predetermine value from the surge generation source 10, the resistance of the non-linear element unit 110 rapidly decreases, so that surge current flows to the ground through the signal generation unit 120.

The signal generation unit 120 generates a control signal in response to the surge current which flows from the non-linear element unit 110, thereby switching the switching status of the switching element unit 130 from off to on. Here, if the resistance of the switched-on switching element unit 130 is noticeably less than the resistance of the non-linear element unit 110 which was rapidly decreased, most of the surge, which flows after the switching element unit 130 has been switched on, flows to the ground through the switching element unit 130.

Next, simulation circuits which simulate the operation of the surge protection apparatus 100 and the results thereof will be described in detail with reference to FIGS. 4 to 9.

Figure 4:
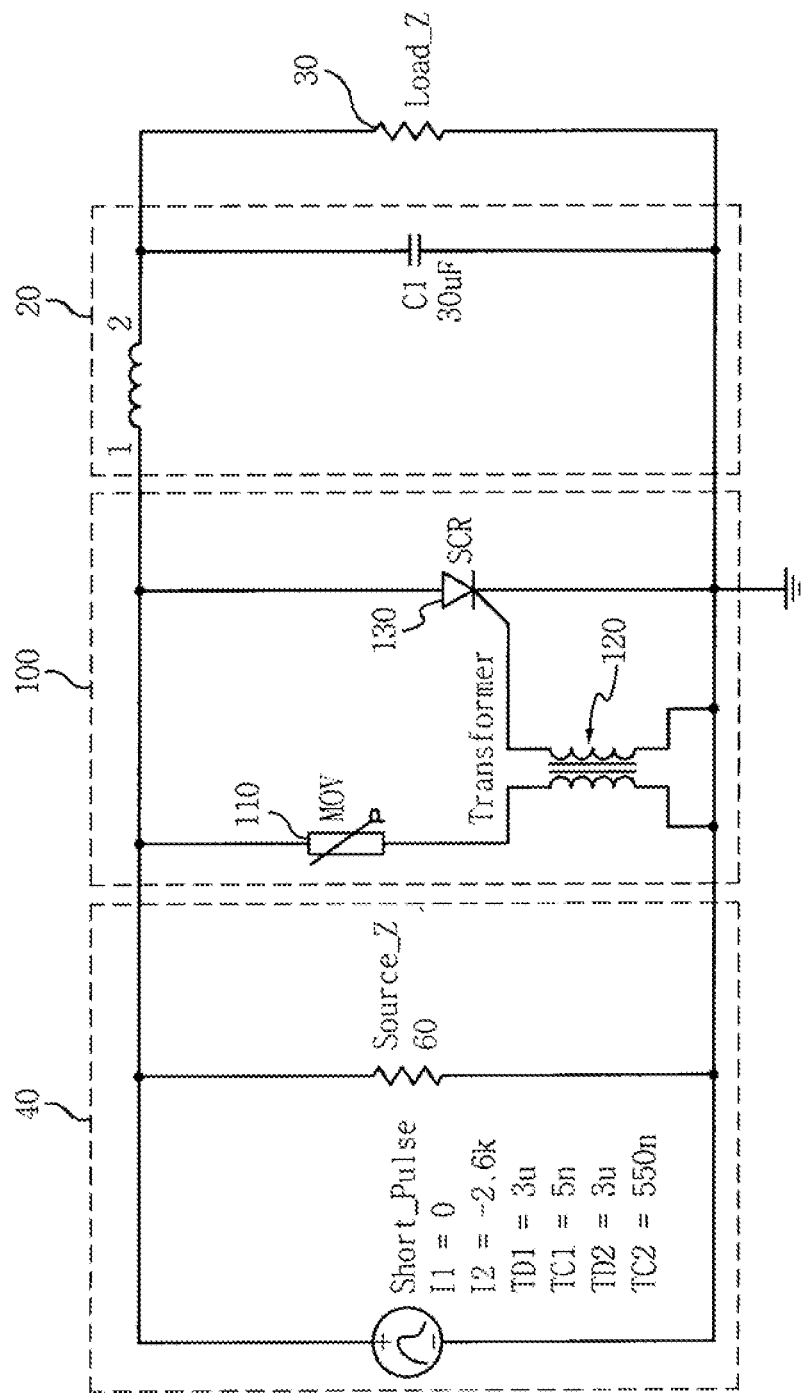
FIG. 4 is a view illustrating a simulation circuit which simulates the operation of a surge protection apparatus according to a first embodiment of the present invention.
Figure 5:
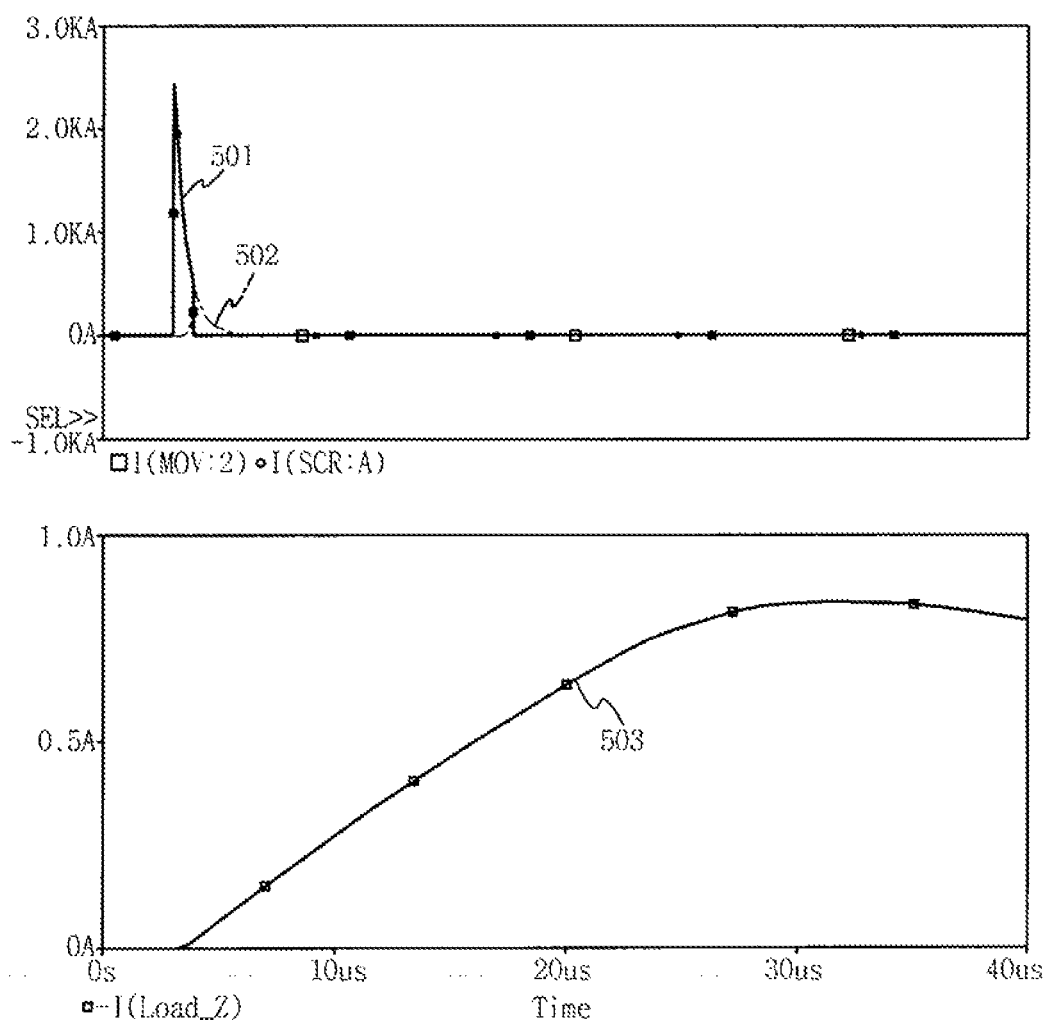
FIG. 5 is a view illustrating the results of a simulation performed by the simulation circuit of FIG. 4.

FIG. 4 is a view illustrating a simulation circuit which simulates the operation of a surge protection apparatus according to a first embodiment of the present invention, and FIG. 5 is a view illustrating the results of a simulation performed by the simulation circuit of FIG. 4.

Referring to FIG. 4, a simulation circuit according to a first embodiment of the present invention includes a surge generation source 40 for generating short pulses which satisfy the conditions of the PCI test of FIG. 1, the surge protection apparatus 100, the filter 20 for removing high-frequency components, and the load resistor Load_Z 30. Here, the filter 20 includes an inductor (506 uH) and a capacitor C1 (30 uF).

The surge protection apparatus 100 according to the first embodiment of the present invention includes a non-linear element unit 110 which has a Metal Oxide Varistor (MOV) having a clamping voltage of 375 V, a signal generation unit 120 which has a toroidal transformer having a primary coil wound 5 times and a secondary coil wound 70 times, and a switching element unit 130 which has an SCR having an on-control voltage of 2V.

Referring to FIG. 5, FIG. 5 illustrates the results of simulation performed on current which passes through the non-linear element unit 110 when a short pulse (rising time: 20 ns, Full Width Half Maximum (FWHM): 550 ns, and peak current: 2.5 kA) which satisfies the conditions of the PCI test of FIG. 1 is input to the surge protection apparatus 100, that is, MOV let-through current 501, simulation performed on current which passes through the switching element unit 130, that is, SCR let-through current 502, and simulation performed on current which passes through the load resistor 30, that is, load resistor let-through current 503, respectively.

In detail, when voltage which is equal to or greater than a predetermine value (375V) is applied to two ends of the non-linear element unit 110 because of the short pulse generated by the surge generation source 40 and the resistance of the non-linear element unit 110 rapidly decreases from dozens of MΩ to several Ω or less, pulse current passes through the signal generation unit 120, that is, the primary coil of the transformer, and then flows to the ground. Thereafter, voltage, which is in proportion to the ratio of the times that the primary coil of the transformer is wound (5 times) to the times that the secondary coil is wound (70 times), is induced to the secondary coil of the transformer in the signal generation unit 120, thereby generating a control signal used to switch the status of the SCR to on. Although the resistance of the switched-on SCR is about several mΩ which is a lot lower than the resistance of the MOV, the delay time required to switch the status of the SCR from off to on is about 1 us, so that only the end portion of the falling short pulse passes through the SCR and flows into the ground. As a result, since the peak value of the MOV let-through current 501 is about 2.5 kA, it can be seen that most of the short pulse is blocked by the non-linear element unit 110.

Figure 6:
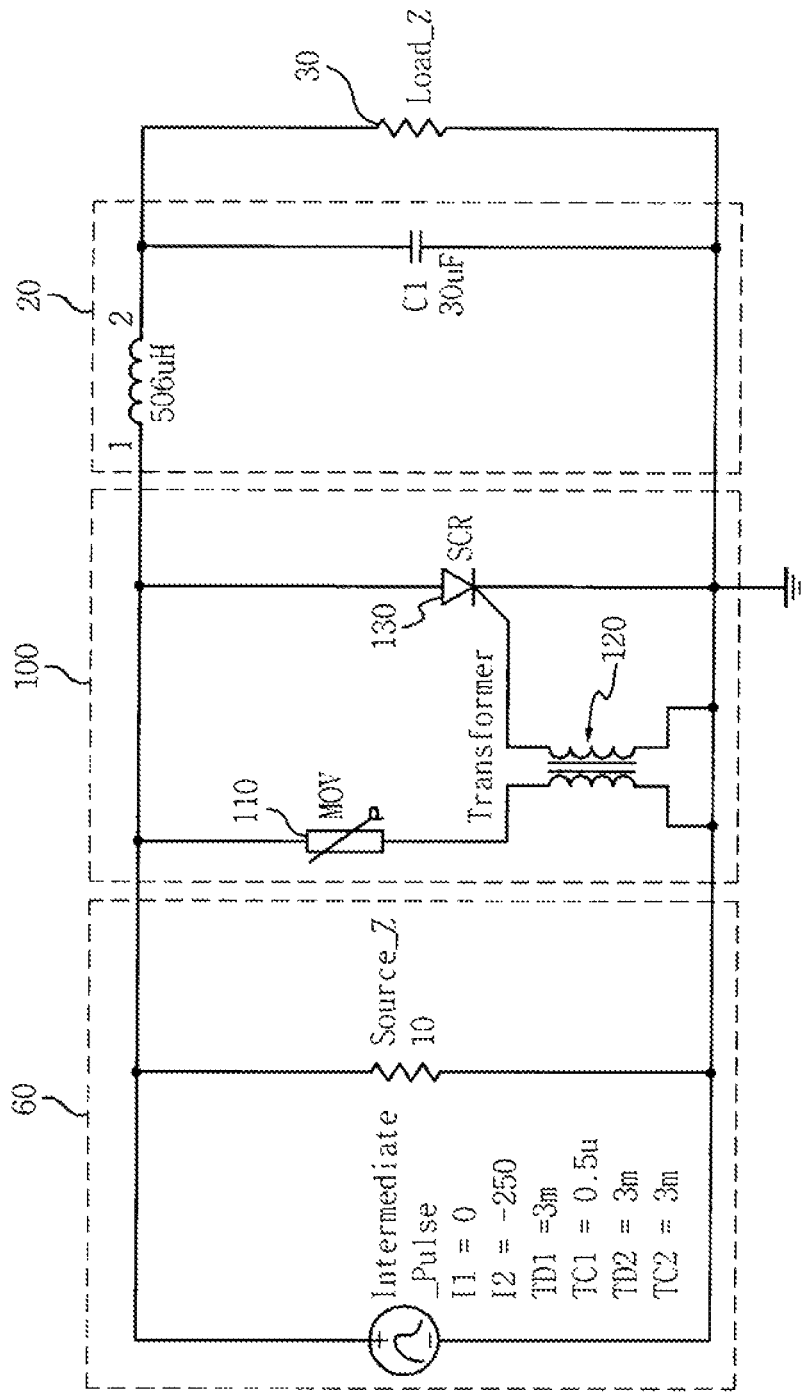
FIG. 6 is a view illustrating a simulation circuit which simulates the operation of a surge protection apparatus according to a second embodiment of the present invention.
Figure 7:
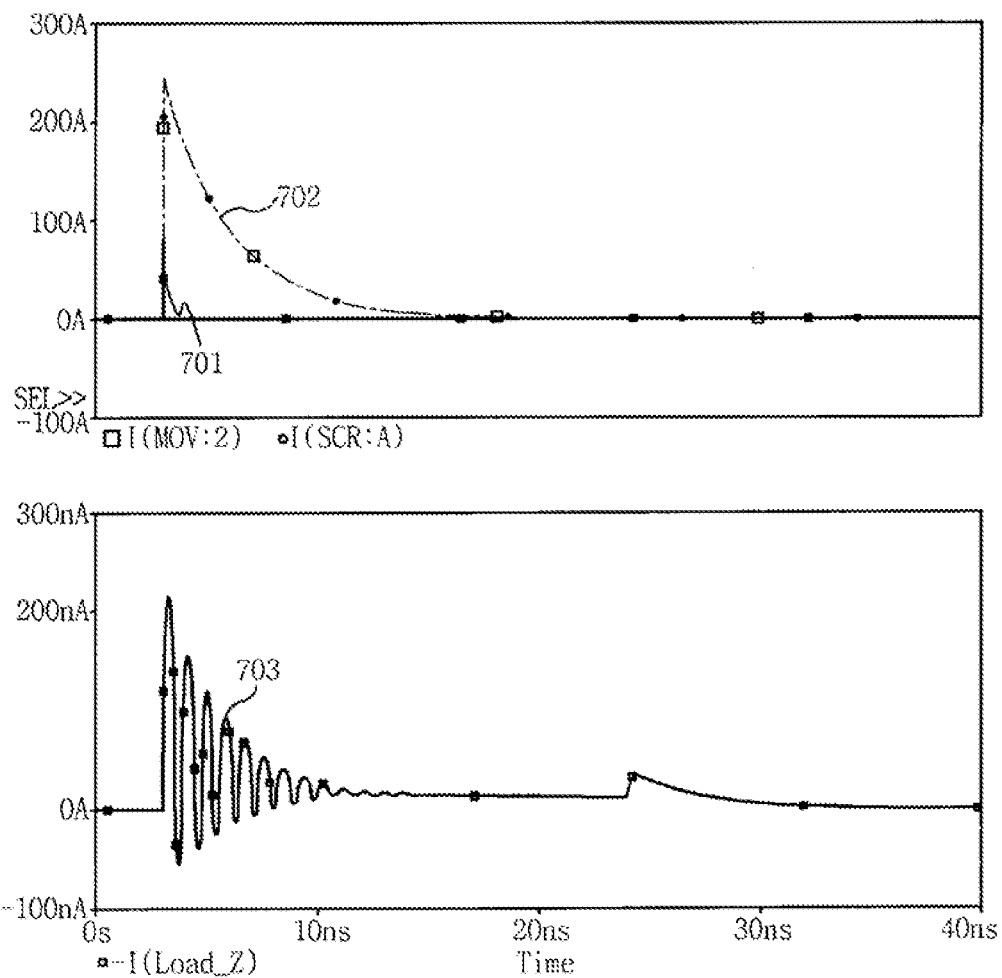
FIG. 7 is a view illustrating the results of a simulation performed by the simulation circuit of FIG. 6.

FIG. 6 is a view illustrating a simulation circuit which simulates the operation of a surge protection apparatus according to a second embodiment of the present invention, and FIG. 7 is a view illustrating the results of a simulation performed by the simulation circuit of FIG. 6.

Referring to FIG. 6, a simulation circuit according to the second embodiment of the present invention includes a surge generation source 60 for generating intermediate pulses which satisfy the conditions of the PCI test of FIG. 1, the surge protection apparatus 100, the filter 20 for removing high-frequency components, and the load resistor Load_Z 30. Here, the filter 20 includes an inductor (506 uH) and a capacitor C1 (30 uF).

The surge protection apparatus 100 according to the second embodiment of the present invention includes a non-linear element unit 110 having an MOV, a signal generation unit 120 having a transformer, and a switching element unit 130 having an SCR, like the surge protection apparatus 100 according to the first embodiment of the present invention.

Referring to FIG. 7, FIG. 7 illustrates the results of simulation performed on current which passes through the non-linear element unit 110 when an intermediate pulse (rising time: 1.5 μs, FWHM: 3 ms, and peak current: 250 A) which satisfies the conditions of the PCI test of FIG. 1 is input to the surge protection apparatus 100, that is, MOV let-through current 701, simulation performed on current which passes through the switching element unit 130, that is, SCR let-through current 702, and simulation performed on current which passes through the load resistor 30, that is, load resistor let-through current 703, respectively.

In detail, in the initial rising period of an intermediate pulse generated by the surge generation source 60, the SCR, that is, the switching element unit 130 is already turned on. Here, since the peak value of the SCR let-through current 702 is about 250 A, it can be seen that most of the intermediate pulse is blocked by the switching element unit 130.

Figure 8:
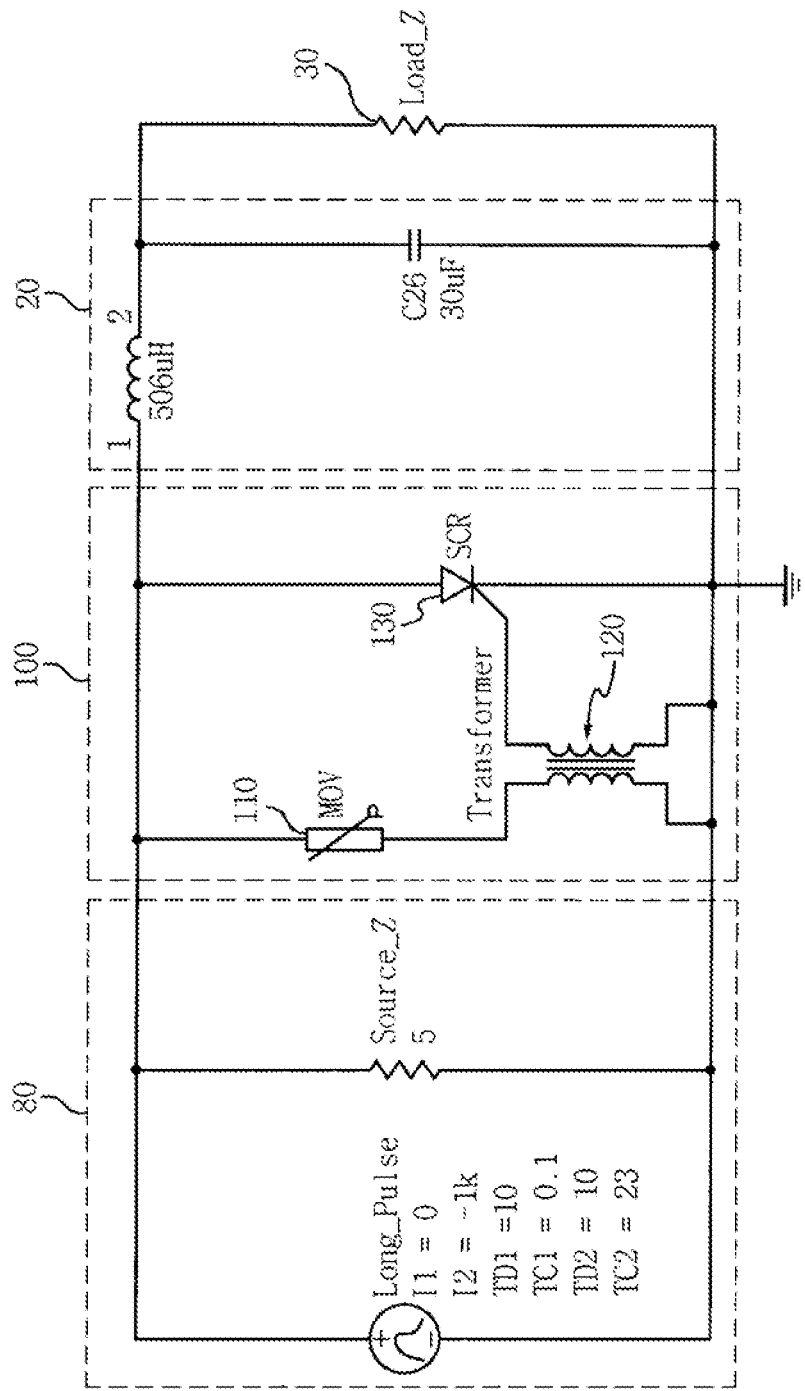
FIG. 8 is a view illustrating a simulation circuit which simulates the operation of a surge protection apparatus according to a third embodiment of the present invention.

FIG. 8 is a view illustrating a simulation circuit which simulates the operation of a surge protection apparatus according to a third embodiment of the present invention, and FIG. 9 is a view illustrating the results of a simulation performed by the simulation circuit of FIG. 8.

Referring to FIG. 8, a simulation circuit according to the third embodiment of the present invention includes a surge generation source 80 for generating long pulses which satisfy the conditions of the PCI test of FIG. 1, the surge protection apparatus 100, the filter 20 for removing high-frequency components, and the load resistor Load_Z 30. Here, the filter 20 includes an inductor (506 uH) and a capacitor C26 (30 uF).

The surge protection apparatus 100 according to the third embodiment of the present invention includes a non-linear element unit 110 having an MOV, a signal generation unit 120 having a transformer, and a switching element unit 130 having an SCR, like the surge protection apparatus 100 according to the first embodiment of the present invention.

Referring to FIG. 9, FIG. 9 illustrates the results of simulation performed on current which passes through the non-linear element unit 110 when a long pulse (rising time: 0.2 s, FWHM: 23 s, and peak current: 1 kA) which satisfies the conditions of the PCI test of FIG. 1 is input to the surge protection apparatus 100, that is, MOV let-through current 901, simulation performed on current which passes through the switching element unit 130, that is, SCR let-through current 902, and simulation performed on current which passes through the load resistor 30, that is, load resistor let-through current 903, respectively.

In detail, as soon as a long pulse raises, the SCR, that is, the switching element unit 130 is switched on. Here, since the peak value of the SCR let-through current 902 approaches 1 kA, it can be seen that most of the long pulse is blocked by the switching element unit 130.

Figure 10:
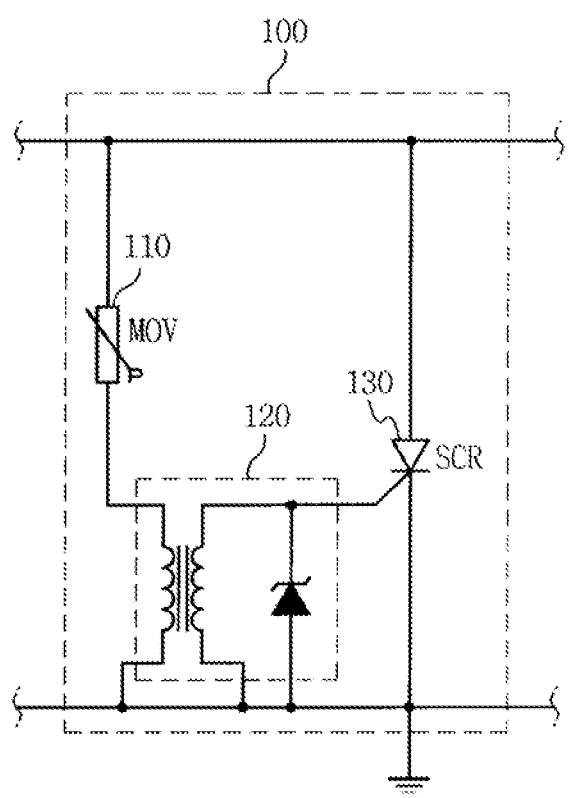
FIGS. 10 and 11 are views illustrating simulation circuits which simulate the operations of surge protection apparatuses according to fourth and fifth embodiments of the present invention.
Figure 11:
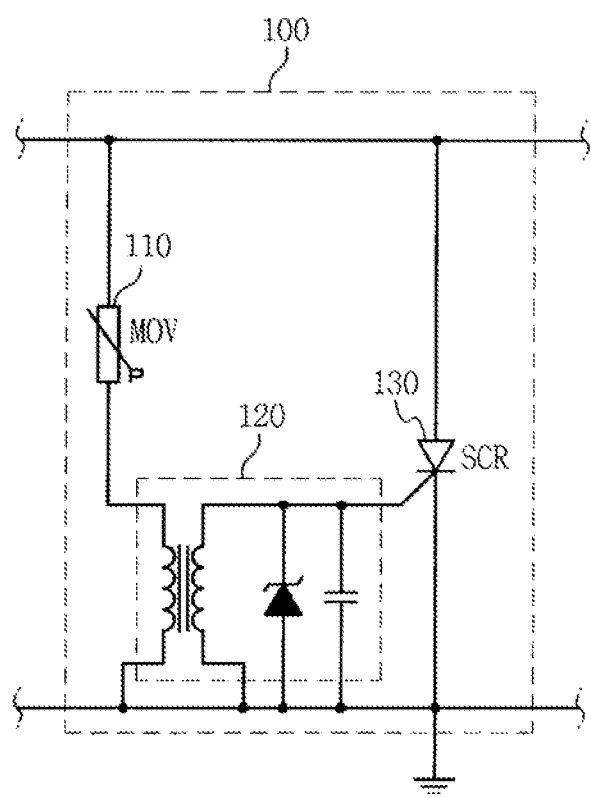

FIGS. 10 and 11 are views illustrating simulation circuits which simulate the operations of surge protection apparatuses according to fourth and fifth embodiments of the present invention.

FIG. 10 illustrates an embodiment in which a zener diode has been added to the surge protection apparatus 100 in order to prevent the voltage of a control signal generated by the signal generation unit 120 from exceeding the allowable range of the switching element 130.

Further, FIG. 11 illustrates an embodiment in which a zener diode and a capacitor have been added to the surge protection apparatus 100 in order to prevent the voltage and variation speed of a control signal generated by the signal generation unit 120 from exceeding the allowable range of the switching element 130.

Figure 12:
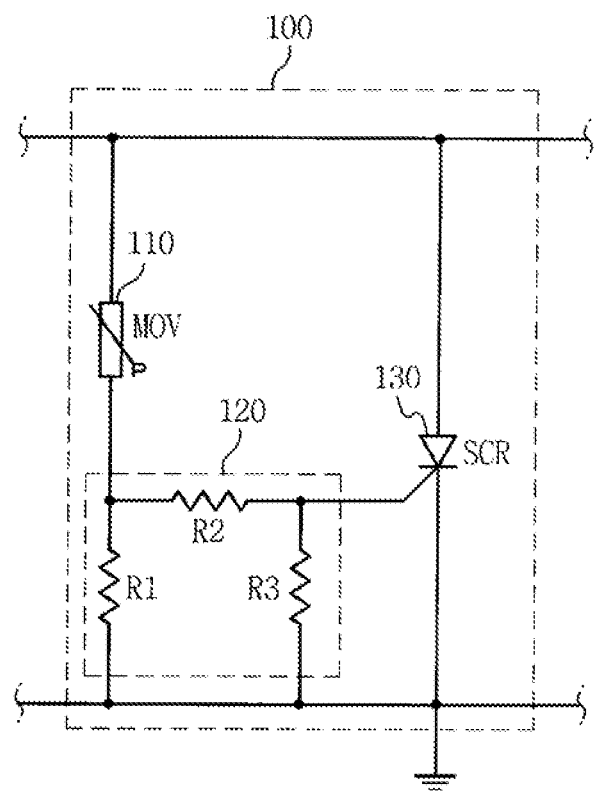
FIGS. 12 and 13 are views illustrating simulation circuits which simulate the operations of surge protection apparatuses according to sixth and seventh embodiments of the present invention.
Figure 13:
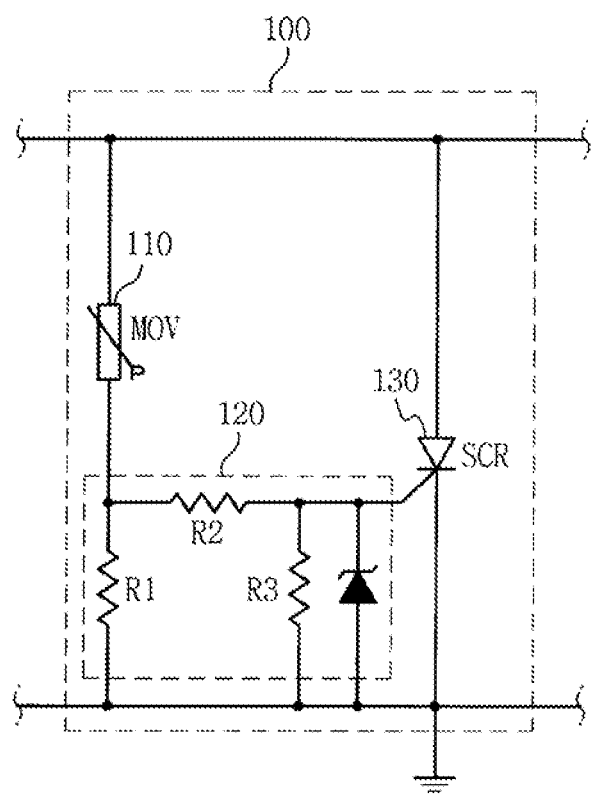

FIGS. 12 and 13 are views illustrating simulation circuits which simulate the operations of surge protection apparatuses according to sixth and seventh embodiments of the present invention.

FIG. 12 illustrates an embodiment in which the signal generation unit 120 includes resistors R1, R2, and R3 which are connected in series and in parallel. The voltage of a control signal is approximately determined as the following Equation 1.

$$\text{control voltage} = I_{nld} \times R1 \times R3 \div (R2+R3) \quad (1)$$

Referring to Equation 1, R1<<R2+R3, and $I_{nld}$ indicates current which passes through the non-linear element unit 110.

Further, FIG. 13 illustrates an embodiment in which a zener diode is added to the signal generation unit 120 which includes the resistors R1, R2, and R3 which are connected in series and in parallel such that the maximum voltage of a control signal is restricted to the breakdown voltage of the zener diode.

Next, a surge protection method will be described in detail with reference to FIG. 14.

Figure 14:
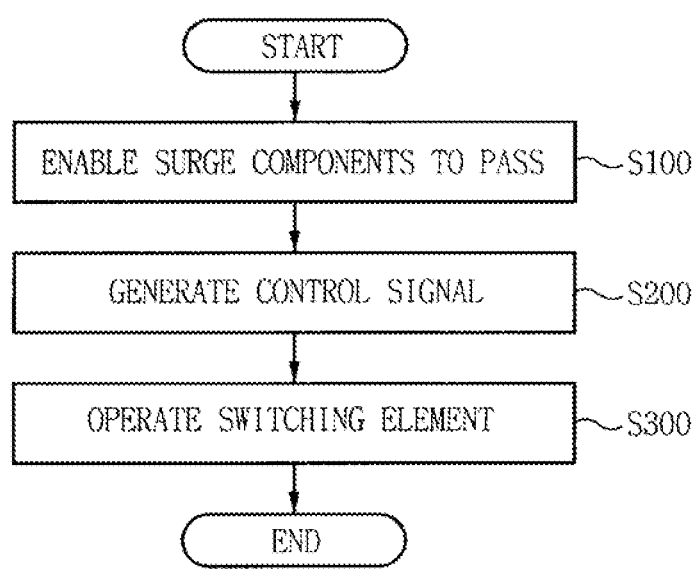
FIG. 14 is a flowchart illustrating a surge protection method according to an embodiment of the present invention.

FIG. 14 is a flowchart illustrating a surge protection method according to an embodiment of the present invention.

First, the surge protection method according to an embodiment of the present invention is performed using a non-linear element unit 110, a signal generation unit 120, and a switching element unit 130.

Referring to FIG. 14, resistance rapidly decreases when the difference in voltage between the two ends of the non-linear element unit 110 is equal to or greater than a predetermined value at step S100. In detail, the non-linear element unit 110 allows an electrical surge, which is received from the surge generation source 10, to pass through the non-linear element unit 110.

The non-linear element unit 110 according to the embodiment of the present invention includes at least one of a varistor, a gas discharge tube, and a transient voltage suppression diode.

The signal generation unit 120 generates a control signal in response to current which passes through the non-linear element unit 110 at step S200.

The signal generation unit 120 may include a transformer.

The signal generation unit 120 may include a transformer and a zener diode.

The signal generation unit 120 may include a transformer, a zener diode, and a capacitor.

The signal generation unit 120 may include one or more resistors.

The signal generation unit 120 may include one or more resistors, and a zener diode.

The switching element unit 130 switches the switching status thereof in response to a control signal at step S300.

The switching element unit 130 according to an embodiment of the present invention includes at least one of a thyristor and a relay. Here, the thyristor is an SCR.

Therefore, the surge protection method according to the embodiment of the present invention uses a non-liner element which has a rapid response speed, a switching element which has the ability to withstand a large amount of energy, and a signal generation unit which connects the non-liner element and the switching element, thereby blocking a high power surge and preventing a high energy surge from flowing into facilities or apparatuses for a long period of time.

According to an embodiment of the present invention, the surge protection apparatus and the method using the same uses a non-liner element which has a rapid response speed, a switching element which has the ability to withstand a large amount of energy, and a signal generation unit which connects the non-liner element and the switching element, thereby blocking a high power surge and preventing a high energy surge from flowing into facilities or apparatuses for a long period of time.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A surge protection apparatus comprising:
    a non-linear element unit for enabling an electrical surge to pass therethrough by rapidly decreasing resistance of the non-linear element unit when a difference in voltage between two ends of the non-linear element unit is equal to or greater than a predetermined value;
    a signal generation unit for generating a control signal in response to current which passes through the non-linear element unit; and
    a switching element unit for changing switching status in response to the control signal,
    wherein the signal generation unit comprises a transformer; and
    wherein each of a zener diode and a capacitor is parallel-connected to a secondary coil of the transformer.

2. The surge protection apparatus as set forth in claim 1, wherein the non-linear element unit comprises at least one of a varistor, a gas discharge tube, and a transient voltage suppression diode.

3. The surge protection apparatus as set forth in claim 1, wherein the signal generation unit comprises a transformer and a zener diode.

4. The surge protection apparatus as set forth in claim 1, wherein the signal generation unit comprises one or more resistors.

5. The surge protection apparatus as set forth in claim 1, wherein the signal generation unit comprises one or more resistors and a zener diode.

6. The surge protection apparatus as set forth in claim 1, wherein the switching element unit comprises at least one of a thyristor and a relay.

7. The surge protection apparatus as set forth in claim 6, wherein the thyristor is a Silicon Controlled Rectifier (SCR).

8. A surge protection method comprising:
    enabling an electrical surge to pass through by rapidly decreasing resistance of a non-linear element unit when a difference in voltage between two ends of the non-linear element unit is equal to or greater than a predetermined value;
    generating a control signal in response to current, which passes through the non-linear element unit, using a signal generation unit; and
    changing switching status of a switching element unit in response to the control signal,
    wherein the signal generation unit comprises a transformer; and
    wherein each of a zener diode and a capacitor is parallel-connected to a secondary coil of the transformer.

9. The surge protection method as set forth in claim 8, wherein the generating the control signal comprises generating a control signal wherein voltage of the generated control signal is restricted to an allowable range of the switching element unit by using a zener diode or a capacitor.

* * * * *